US009107139B2

United States Patent
Sirotkin et al.

(10) Patent No.: US 9,107,139 B2
(45) Date of Patent: Aug. 11, 2015

(54) INTELLIGENT P-GW RELOCATION FOR SIPTO SERVICE CONTINUITY

(75) Inventors: Alexander Sirotkin, Tel-Aviv (IL); Muthaiah Venkatachalam, Beaverton, OR (US); Chang Hong Shan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 13/990,655

(22) PCT Filed: Dec. 16, 2011

(86) PCT No.: PCT/US2011/065619
§ 371 (c)(1),
(2), (4) Date: May 30, 2013

(87) PCT Pub. No.: WO2012/134566
PCT Pub. Date: Oct. 4, 2012

(65) Prior Publication Data
US 2014/0043993 A1 Feb. 13, 2014

Related U.S. Application Data

(60) Provisional application No. 61/471,042, filed on Apr. 1, 2011.

(51) Int. Cl.
*H04L 12/26* (2006.01)
*H04W 48/10* (2009.01)
(Continued)

(52) U.S. Cl.
CPC ............ *H04W 48/10* (2013.01); *H04B 7/0456* (2013.01); *H04B 7/0486* (2013.01);
(Continued)

(58) Field of Classification Search
CPC ............ H04W 36/00; H04W 36/0005; H04W 36/0027; H04W 88/14; H04W 36/04; H04W 36/10; H04W 48/18; H04W 36/22; H04W 88/06; H04W 8/02
USPC .................................. 370/252, 331, 338, 328
See application file for complete search history.

(56) References Cited

U.S. PATENT DOCUMENTS

2003/0169712 A1* 9/2003 Tsao ............................. 370/338
2004/0052212 A1* 3/2004 Baillargeon .................. 370/235
(Continued)

FOREIGN PATENT DOCUMENTS

CN 103563444 A 2/2014
WO WO-2012134566 A1 10/2012

OTHER PUBLICATIONS

"International Application Serial No. PCT/US2011/065619, International Search Report mailed Jul. 9, 2012", 5 pgs.
(Continued)

*Primary Examiner* — Andrew Chriss
*Assistant Examiner* — Romani Ohri
(74) *Attorney, Agent, or Firm* — Schwegman Lundberg & Woessner, P.A.

(57) ABSTRACT

Intelligent packet data network gateway (P-GW) relocation for selected internet protocol traffic offload (SIPTO) service continuity is described. A user equipment (UE) application monitoring module, can monitor the network session state for a UE. A transition window can be determined based on both the network session state and a session continuity impact metric. A new packet data network gateway (P-GW) can be associated to the UE during the transition window in response to a determination that a current P-GW of the UE is less optimal, in at least one performance metric, than the new P-GW.

22 Claims, 8 Drawing Sheets

(51) Int. Cl.
| | |
|---|---|
| *H04B 7/04* | (2006.01) |
| *H04B 7/06* | (2006.01) |
| *H04L 25/02* | (2006.01) |
| *H04W 24/10* | (2009.01) |
| *H04W 24/00* | (2009.01) |
| *H04W 52/18* | (2009.01) |
| *H04W 72/04* | (2009.01) |
| *H04L 29/06* | (2006.01) |
| *H04W 52/14* | (2009.01) |
| *H04W 24/02* | (2009.01) |
| *H04W 28/08* | (2009.01) |
| *H04L 5/00* | (2006.01) |
| *H04L 12/721* | (2013.01) |
| *H04W 4/00* | (2009.01) |
| *H04W 48/12* | (2009.01) |
| *H04W 52/02* | (2009.01) |
| *H04L 25/03* | (2006.01) |
| *H04W 28/04* | (2009.01) |
| *H04W 72/00* | (2009.01) |
| *H04W 88/02* | (2009.01) |
| *H04W 88/08* | (2009.01) |
| *H04W 92/20* | (2009.01) |

(52) U.S. Cl.
CPC ........... *H04B 7/0632* (2013.01); *H04B 7/0639* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01); *H04W 4/005* (2013.01); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 2025/03426* (2013.01); *H04L 2025/03802* (2013.01); *H04W 28/048* (2013.01); *H04W 72/00* (2013.01); *H04W 88/02* (2013.01); *H04W 88/08* (2013.01); *H04W 92/20* (2013.01)

(56) References Cited

U.S. PATENT DOCUMENTS

| | | | |
|---|---|---|---|
| 2007/0253359 A1* | 11/2007 | Hall et al. | 370/328 |
| 2009/0092051 A1 | 4/2009 | Miyata | |
| 2011/0075557 A1* | 3/2011 | Chowdhury et al. | 370/230 |
| 2011/0223956 A1* | 9/2011 | Villion et al. | 455/513 |
| 2012/0210006 A1* | 8/2012 | Vihtari | 709/227 |

OTHER PUBLICATIONS

"International Application Serial No. PCT/US2011/065619, Written Opinion mailed Jul. 9, 2012", 3 pgs.

"International Application Serial No. PCT/US2011/065619, International Preliminary Report on Patentability mailed Oct. 10, 2013", 5 pgs.

* cited by examiner

INTELLIGENT P-GW RELOCATION FOR SIPTO SERVICE CONTINUITY

CLAIM OF PRIORITY

This patent application is a U.S. National Stage Filing under 35 U.S.C. 371 from International Patent Application Serial No. PCT/US2011/065619, filed Dec. 16, 2011, published on Oct. 4, 2012 as WO/2012/134566 A1, which claims the benefit of priority under 35 U.S.C. Section 119(e), to U.S. Provisional Patent Application Ser. No. 61/471,042, titled "Advanced Wireless Communication Systems and Techniques," filed on Apr. 1, 2011, which is hereby incorporated by reference herein in its entirety all of which are incorporated herein by reference in their entirety.

BACKGROUND

Modern information networks are often combinations of data networks, including heterogeneous combinations. Often, a client device connected to a first network communicate with a second network (e.g., connect to services of the second network) via the first network. The two networks can use different protocols (e.g., addressing, framing, packetizing, etc.) to address devices or transmit data. Devices, such as network bridges or gateways, can be used to allow client devices to communicate from the first network (e.g., the network to which the client device is initially connected) by translating client device communications between the different protocols of the two networks.

In modern cellular networks, such as a networks adhering to the 3GPP Long Term Evolution Advanced (LTE-A) (e.g., 3GPP Long Term Evolution release 10, 3GPP standard 36.21X vb.x.x, release 11 and beyond) family of standards, user equipment (UE) (e.g., client devices such as cellular telephones, tablet computers, or other computing or communications devices) can initially connect to a cellular provider's core network for voice or data services. Through this core network, capable UEs can connect to packet data networks (PDNs), such as the Internet, for additional services. In LTE-A networks, the UE generally first interfaces with a serving gateway (S-GW) of the core network, and, based on this UE point of attachment, a PDN gateway (P-GW) is selected and associated with the UE. The UE's traffic is routed from the S-GW through the core network to the selected PDN gateway (P-GW) that then interfaces with the PDN. This process is known as selected internet protocol (IP) traffic offload (SIPTO).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
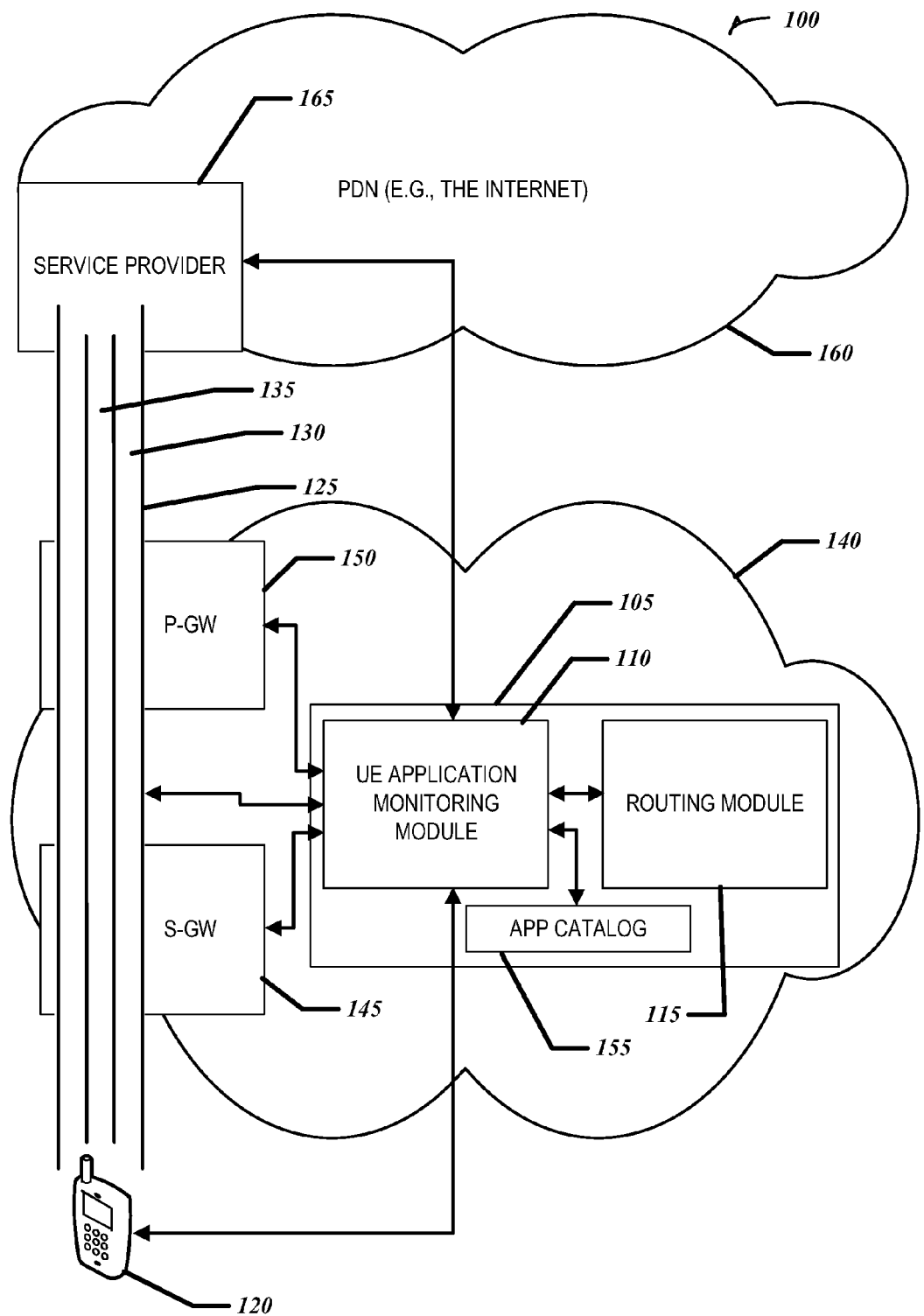
FIG. 1 illustrates an example system including an example network infrastructure component to perform intelligent P-GW relocation for SIPTO service continuity, according to one embodiment.

For illustrative purposes the core network, UE, or system examples discussed below generally adhere to the LTE-A family of standards. However, the disclosed systems, apparatuses, or methods are not so limited and are applicable to other network configurations.

In networks that use the previously described S-GW and P-GW arrangement, the P-GW can assign one or more PDN characteristics to the UE. For example, to communicate with the internet, the UE can be assigned an IP address by the P-GW. In an example, changing the PDN characteristics can impact the network session continuity of an active PDN session. For example, changing the UE's IP address while a video is streaming to the UE can result in an interruption of the video. Maintaining session continuity is a provider goal in order to meet customer expectations.

Maintaining an efficient core network is another goal for service providers. As a UE moves through space (e.g., as a mobile phone travels about a city with its operator) the UE can interface with different access points (e.g., a base station, eNb, wireless transmission points, etc.) during its travels. These access points can be associated with different S-GWs. If, for example, a PDN session were initiated at a first S-GW, a corresponding P-GW would be associated to the UE. As the UE moved and changed S-GWs, the provider may desire changing the P-GW to address its network efficiency concern because the original P-GW may be too distant from a current S-GW (e.g., in the number of network devices communications must pass through, physical distance, etc.) to be efficient. However, because PDN characteristics are assigned to the UE by the original P-GW, changing the P-GW during an active PDN session can lead to PDN session interruptions and negatively affect the provider's goal of maintaining session continuity. This issue can be exacerbated by the proliferation of UE always-on connectivity. Placing P-GWs deeper into the provider's core network (e.g., were a P-GW can serve more S-GWs with nearly equivalent efficiency) can abate some session continuity issues at the expense of efficiently offloading the PDN traffic from the core network.

Intelligent P-GW relocation (e.g., changing P-GWs) for SIPTO service continuity can address providers' dual goals of maintaining session continuity and maintaining an efficient core network. By monitoring, for example at a network infrastructure component of the core network, network session state for a UE and determining a transition window based on both that network session state and a session continuity impact metric, the UE can be associated with a new P-GW during the transition window in response to a determination that the current UE P-GW is less optimal, in at least one performance metric, than the new P-GW.

For example, given a UE application that can have active PDN sessions—such as when: transferring files using file transfer protocol (FTP); web browsing; downloading hypertext markup language (HTML); streaming video; using voice over IP (VOIP); video calling; and instant messaging among others—the UE application can have inactivity periods (e.g., time periods of no activity or of activity that can be quickly resumed by the application) where the PDN session can be interrupted (e.g., changing the UE's IP address) without any, or with minimal, interruption to the service continuity as perceived by the UE's user. Thus, a window can exist during these inactivity periods whereby transitioning from one P-GW to another, along with an IP address change for the UE, does not interrupt the service continuity. Accurate determination of these transition windows can lead to greater (e.g., more frequent) opportunities for the provider to change the P-GW associated with the UE. This can, in turn, allow the provider to locate the P-GWs closer to the S-GWs to efficiently offload PDN traffic from the core network without unduly impacting the service continuity goal of the provider.

FIG. 1 illustrates an example system 100 including an example network infrastructure component 105 to perform intelligent P-GW relocation for SIPTO service continuity, according to one embodiment. In an example, network infrastructure component 105 can be a mobility management entity (MME) as defined in the LTE-A family of standards.

In an example, the system 100 can include UE 120 and core network 140. In an example, the system 100 can include a PDN 160 (e.g., the Internet) or multiple PDNs. In an example, the core network 140 can include one or more S-GWs 145 and one or more P-GWs 150. In an example, the S-GW 145 can be configured to interface the application network traffic 125 of the UE 120 to the core network 140. In an example, the P-GW 150 can be configured to interface the application network traffic 125 to the PDN 160. In an example, the PDN 160 can include an application service provider 165 configured to provide data or other services to the application. In an example, the application network traffic 125 can include different layers (e.g., levels) of or protocols. In an example, the application network traffic 125 can include a network layer 130 (e.g., any one or more of layers one through six of the open systems interconnection model (OSI model)). In an example, the OSI model layers one through six can respectively include the physical layer, the data link layer, the network layer, the transport layer, the session layer, and the presentation layer. In an example, the application network traffic 125 can include an application layer 135. In an example, the application layer 135 can include the OSI layer seven.

The wireless infrastructure component 105 can include a UE application monitoring module 110 and a routing module 115 that are communicatively coupled to each other. In an example, the wireless infrastructure component 105 can also include an application catalog 155 communicatively coupled to the UE application monitoring module 110. In an example, the UE application monitoring module 110 can be communicatively coupled to any one or more of the UE 120, the application network traffic 125, the S-GW 145, the P-GW 150, or the application service provider 165.

The UE application monitoring module 110 can be configured to monitor a network session state for the UE 120. In an example, the network session state can include the session state of an application running on the UE.

In an example, the UE application monitoring module 110 can be configured to inspect the application network traffic 125 using deep packet inspection (DPI) to monitor the network session state for the UE 120. DPI (e.g., complete packet inspection or information extraction) can include analyzing the data or headers of the application network traffic 125 to determine the current state of the application. In an example, DPI is analysis of the application layer 135. Using DPI, the UE application monitoring module 110 can determine what the application is or whether a PDN session can be interrupted without unduly impacting the service continuity of the application.

In an example, the UE application monitoring module 110 can be configured to identify the application service provider 165. For example, if the application is a social networking application, the application service provider 165 would be the service (e.g., available via a web site, web service, or other PDN service endpoint technologies) supporting the social network. In an example, to monitor the network session for the UE, the UE application monitoring module 110 can be configured to retrieve, receive, or both retrieve and receive an impact of the session state of the application for changing a PDN characteristic of the application network traffic 125 or UE 120 from the application service provider 165. In an example, the PDN characteristic can be an IP address of the UE 120 (e.g., a change in the PDN characteristic is an IP address change for the UE 120). In an example, the PDN characteristic can be other parameters provided to the UE 120 to operate on the PDN 160. These parameters could include such things as packet size, encryption keys, data control procedures, or any other parameter assigned to the UE 120 or the application network traffic 125 to allow the application network traffic 125 to operate from the core network 140 to the PDN 160. In an example, changing the PDN characteristic affects network session continuity of the application when there is an active PDN session for the application. In an example, one or more PDN characteristics (e.g., of the UE 120) are changed when the UE 120 is transitioned from a current P-GW 150 to a new P-GW.

The impact of the session state of the application, for example retrieved from the application service provider 165, can provide information to the UE application monitoring module 110 on the current state of the PDN session. For example, the impact of the session state of the application could be a numerical report indicating the level of severity of changing the PDN characteristic. In an example, the report could report the impact via the state, such as by providing an 'idle' indication when the PDN can be interrupted without a network session continuity impact; a 'minimal' indication when the impact would be minor (e.g., an instant chat application reconnecting to the application service provider 165 between transmissions); or severe when the impact would lead to more serious interruptions (e.g., a video streaming application that, when interrupted, would require the user to start the video over after reconnection to the application service provider 165).

In an example, the UE application monitoring module 110 and the application service provider 165 can be configured to use Interworking between Mobile Operators using the Evolved Packet System, and Data Application Providers (MOSAP) as provided in the LTE-A family of standards. These configurations can include architectural adaptions (e.g., application interfaces, authentication or communications protocols, etc.). In an example, the core network 140 can provide authentication for applications. In an example, the core network 140 can provide and enforce policy interactions for the core network's 140 services or for the application service provider 165.

In an example, the UE application monitoring module 110, in order to monitor the network session state for the UE, can be configured to receive, retrieve, or both receive and retrieve the impact of the session state of the application for changing the PDN characteristic (e.g., as discussed above) from the UE 120. For example, similar to the UE application monitoring module's 110 interaction(s) with the application service provider 165 discussed above, this information can be gathered from the UE 120. Further examples are discussed below with respect to FIG. 3.

In an example, UE application monitoring module 110, in order to monitor the network session state for the UE, can be configured to determine a network quality of service (QOS) indicator for the application network traffic 125 and associate the network QOS indicator to an impact of the network session continuity for changing the PDN characteristic. For example, the UE application monitoring module 110 can observe network layer 130 traffic, interface with routers or switches, or otherwise obtain a QOS level for application network traffic 125. QOS levels can be numerical or symbolic and correspond to various network based procedures for handling traffic at a specific QOS level. For example, a given QOS levels of high and low priority, high priority traffic may be delivered before low priority traffic. Other types of QOS levels could specific, for example, a guaranteed delivery, or specify that an undelivered piece of data should not be retransmitted. These QOS levels can be associated with various impacts of the network session continuity. For example, high priority traffic can be associated with a severe impact of the network session continuity whereas low priority traffic can be associated with a minor (e.g., easily recoverable) impact of the network session continuity. In an example, the QOS levels can include active TCP sessions (e.g., an active TCP session is associated to one QOS level and an inactive TCP session is associated to a different QOS level). In an example, QOS levels can include UE 120 connectivity information (e.g., active or inactive data sessions, UE 120 idle state, etc.) obtained via radio resource control (RRC) signaling of a LTE-A network, for example from a base station.

Monitoring the network session state for the UE 120, by the UE application monitoring module 110, can include direct monitoring of the application network traffic 125 (e.g., via DPI or network QOS levels as described above), retrieving or receiving information from application service provider 165 of the application (e.g., as described above), receiving information from the UE 120 (e.g., as described above), or any combination thereof. For direct monitoring of the application network traffic 125, the application network traffic 125 can be observed at a core network 140 component (e.g., a router, bridge, gateway, etc.), the application network traffic 125 can be routed through the network infrastructure component 105, or some or all of the application network traffic 125 can be copied and directed to the network infrastructure component 105.

In addition to being configured to monitor the network session state for the UE 120, the UE application monitoring module 110 can be configured to determine a transition window based on both the network session state and a session continuity impact metric. In an example, the session continuity impact metric can be a degree of service interruption for the application perceived by a user of the UE 120. For example, given degree's zero, one, and two, degree zero could be an interruption that the user cannot perceive (e.g., changing an IP address between HTTP requests), degree one could be a minor interruption perceived by the user (e.g., playing music stutters), and degree two could be a major interruption (e.g., the service is interrupted and the user must log back onto the service). The degree of service interruption can be expressed numerically, symbolically, or via more complex data structures.

In an example, by comparing the current network session state to the session continuity impact metric, the UE application monitoring module 110 can identify PDN session periods whereby changing the PDN characteristic won't disrupt the PDN session more that the session continuity impact metric. Thus, the provider can establish periods in which a new P-GW can be assigned to the UE 120 while still maintaining the desired user experienced continuity.

In an example, in order to determine the transition window, the UE application monitoring module 110 can be configured to determine a time period in which changing the PDN characteristic would not affect network session continuity of the application to a degree greater that the session continuity impact metric. For example, given a three degree level of the session continuity impact metric starting at zero, if the session continuity impact metric is one, changing the PDN characteristic during the determined time period would result in a network session continuity impact of degree zero or one. Thus, the core network 140 provider can set the level session continuity via the session continuity impact metric.

In an example, given the retrieval or receipt of an impact of the session state of the application (e.g., via DPI, the application service provider 165, the UE 120, or associating network QOS indicators as described above), the UE application monitoring module 110 can be configured to identify a beginning of the time period in response to matching the impact metric of the network session continuity to the retrieved or received impact of the session state of the application. In an example, the UE application monitoring module 110 can be configured to identify a beginning of the time period by matching a network traffic marker (described below with respect to FIG. 4) to the session continuity impact metric. Thus, in a stream, of data, when the UE application monitoring module 110 first observes that the impact of changing the PDN characteristic on the PDN session is less than or equal to the session continuity impact metric, the time of that first observation marks the beginning of the time period. In an example, the end of the time period can correspond to a fixed time offset from the beginning of the time period (e.g., 10 ms). In an example, the time period can continue until the UE application monitoring module 110 observes the impact of the session state of the application becoming greater than the session continuity impact metric.

The routing module 115 can be configured to associate a new P-GW to the UE 120 during the transition window (e.g., as determined by the UE application monitoring module 110) in response to a determination that the current P-GW 150 of the UE 120 is less optimal, in at least one performance metric, than the new P-GW. In an example, associating a new P-GW to the UE 120 changes at least one PDN characteristic (e.g., IP address) for the UE 120. In an example, the routing module 115 can be configured to make the determination that the current P-GW 150 of the UE 120 is less optimal than the new P-GW. In an example, the routing module 115 can be configured to receive the determination that the current P-GW 150 of the UE 120 is less optimal than the new P-GW.

In an example, the performance metric corresponds to a measurable aspect of a P-GW's 150 efficiency in the core network 140. For example, the performance metric can measure physical distance (e.g., between S-GW 145 and P-GW 150), logical distance (e.g., the number of network devices application network traffic 125 passes through between S-GW 145 and P-GW 150), load (e.g., number of UEs served by the P-GW 150), etc.

Figure 2A:
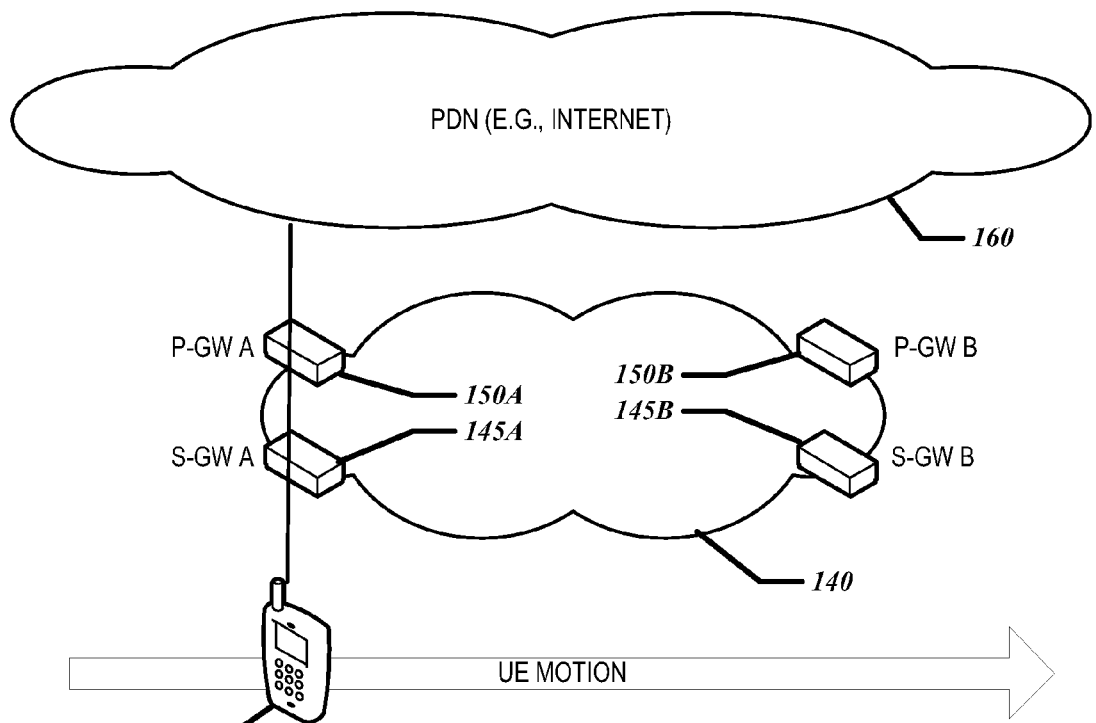
FIGS. 2A-B illustrate two views of P-GW relocation for a UE physically moving in a core network at different points in time, according to one embodiment.
Figure 2B:
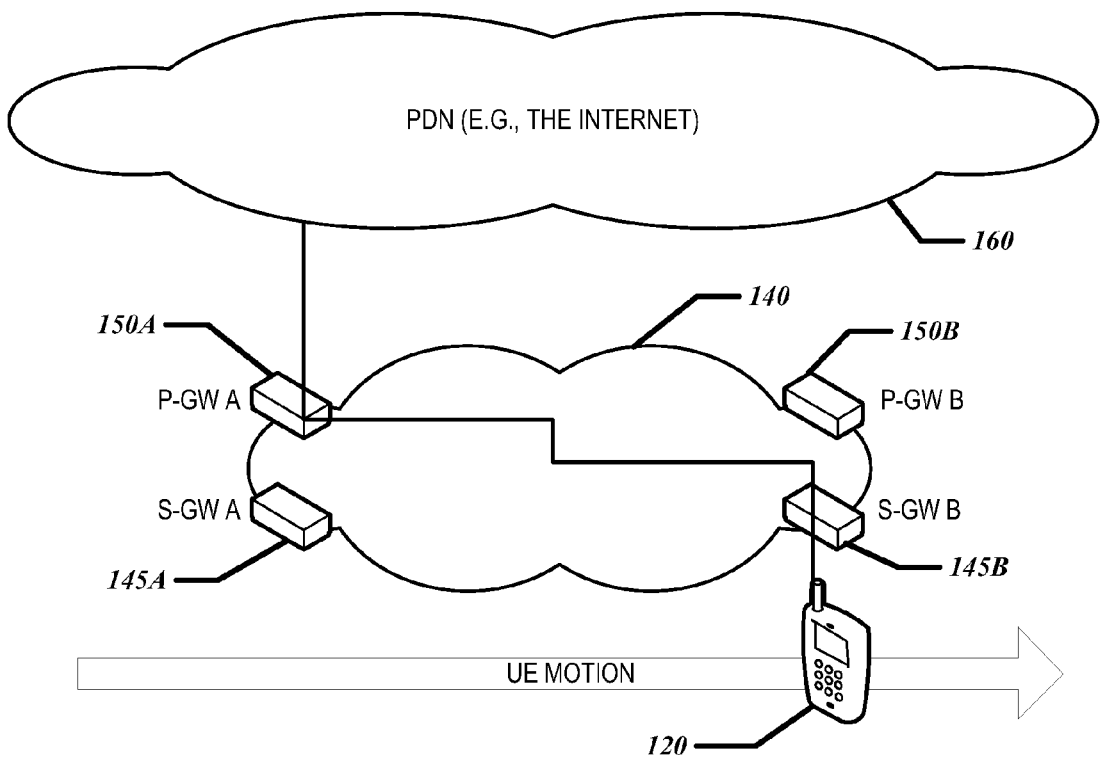

FIGS. 2A-B illustrate two views of P-GW relocation for a UE 120 physically moving in a core network 140 at different points in time, according to one embodiment. FIG. 2A illustrates an initial P-GW A 210A associated with UE 120 via S-GW A 205A. In this example, P-GW A 210A was chosen because it had was more optimal than P-GW B 210B with respect to S-GW A 205A when a PDN session was initiated. As the UE 120 moves (e.g., in a car traveling between cities) the UE 120 can also be associated with other S-GWs, such as S-GW B 205B as illustrated in FIG. 2B. FIG. 2B also illustrates that, although UE 120 is still associated with P-GW A 210A, P-GW B 210B is more optimal with respect to the new S-GW B 205B. Thus, transitioning UE 120 from P-GW A 210A to P-GW B 210B is desirable for the core network 140 provider to maintain core network 140 efficiency by offloading the SIPTO traffic sooner. By performing this transition during the transition window determined by the UE application monitoring module 110, the core network 140 provider can also maintain its desired level of session continuity for the UE 120.

Figure 3:
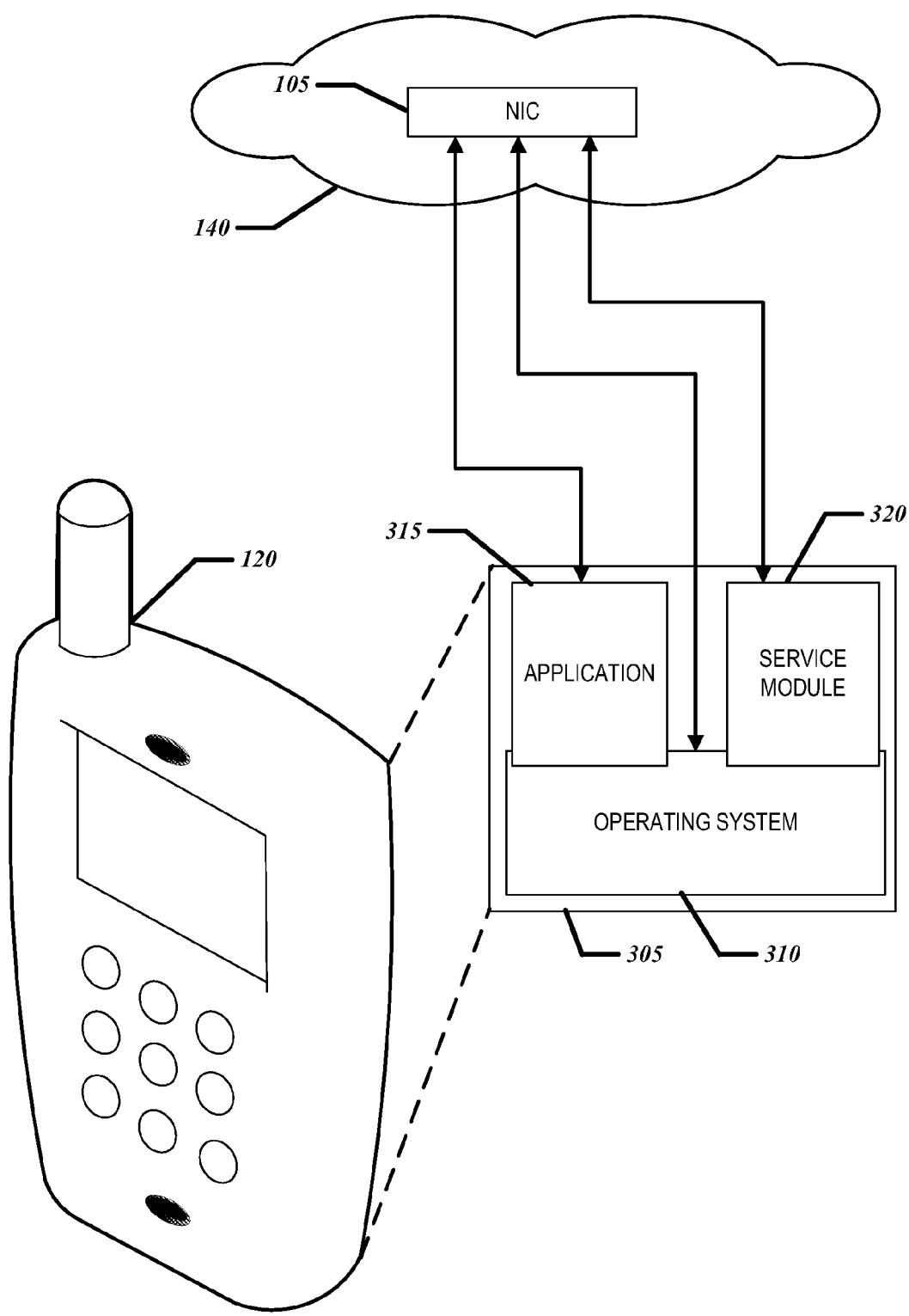
FIG. 3 illustrates example components of a UE to report network session state to a network infrastructure component, according to one embodiment.

FIG. 3 illustrates example components of a UE 120 to report network session state to a network infrastructure component 105, according to one embodiment. UE 120 can include a UE platform 305. The UE platform 305 can include software or hardware to support voice or data operations of the UE 120. For example, the UE platform 305 can include an UE operating system 310, a UE service module 320, or an application 315. In an example, the application 315 is the application discussed above with respect to FIG. 1. In an example, the application 315 and the UE service module 320 can run on, or within, the UE operating system 310. In an example, one or more of the UE operating system 310, the application 315, and the UE service module 320 can be communicatively coupled to the network infrastructure component 105. In an example, the UE operating system 310, the application 315, and the UE service module 320 can be communicatively coupled to each other in any combination of the three.

The UE service module 320 can be configured to query the application 315 to determine the impact of the session state of the application and transmit the impact of the session state of the application to the UE application monitoring module 110. In an example, the UE service module 320 can observe application network traffic 125 originating from the application 315 to determine the impact of the session state of the application. In an example, the UE service module 320 can register with the application 315 and receive the impact of the session state of the application from the application 315 (e.g., periodically or when the impact of the session state of the application changes). In an example, the UE service module 320 is a component of the network infrastructure component 105 (e.g., a software program transferred and executed on the UE 120). In an example, the UE service module 320 is configured to transmit the impact of the session state of the application in response to a request from the UE application monitoring module 110. In an example, the application 315 can be configured to determine the impact of the session state of the application and transmit it to the UE application monitoring module 110. In an example, the UE operating system 310 can be configured to determine the impact of the session state of the application and transmit it to the UE application monitoring module 110.

Figure 4:
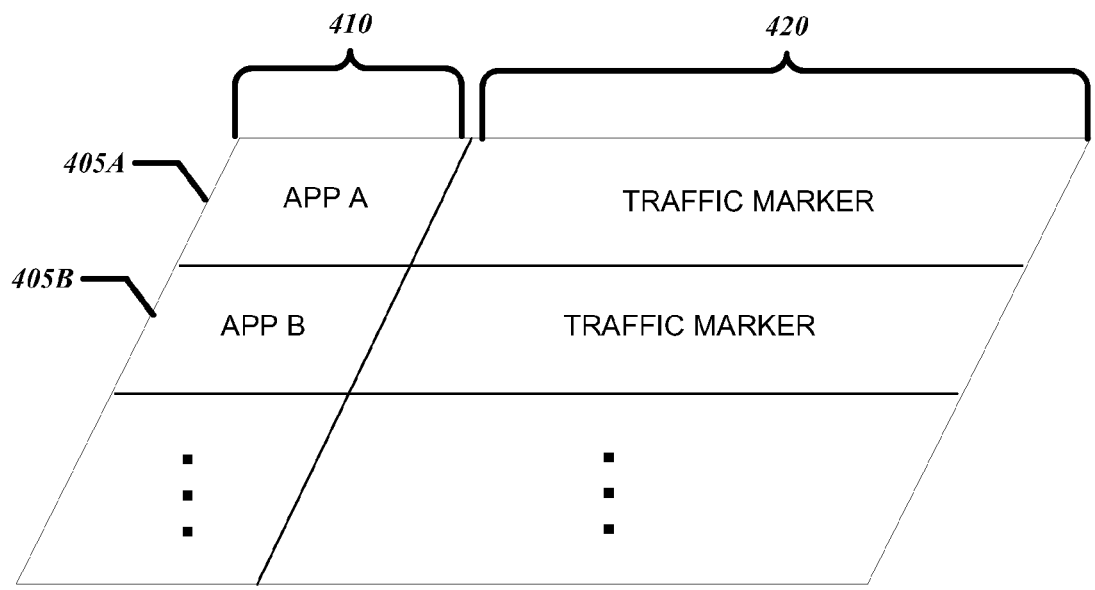
FIG. 4 illustrates an example application catalog that can be used to facilitate intelligent P-GW relocation for SIPTO service continuity, according to one embodiment.

FIG. 4 illustrates an example application catalog 155 that can be used to facilitate intelligent P-GW relocation for SIPTO service continuity, according to one embodiment. The application catalog 155 can include one or more entries 405 (e.g., entry A 405A and entry B 405B) corresponding to one or more applications. In an example, an entry 405 (e.g., entry A 405A) can include an index 410 and a network traffic marker 420. In an example, the index 410 can identify the application corresponding to the entry 405. In an example, a single index 410 can be associated with multiple network traffic markers 420. In an example, the index 410 is absent from the entry A 405A.

In an example, the network traffic marker 420 can be observable (e.g., by the UE application monitoring module 110) via DPI. In an example, the network traffic marker 420 can correspond to a point in a network session for the application. In an example, the network traffic marker 420 can include the impact of the network session for changing the PDN characteristic at the point. For example, the network traffic marker 420 could be a bit stream pattern corresponding to a transaction ending operation in the application. The application could quickly recover from a PDN characteristic change immediately following the operation, but the user may perceive the interruption (e.g., a minor interruption as described above). Thus, the network traffic marker 420 would include the minor character of interrupting the network session after the marker (e.g., the bit stream pattern) is observed.

In an example, when the application catalog 155 described here is employed, the UE application monitoring module 110 can be configured to retrieve, for example the entry A 405A, based on matching the impact on the network session continuity, from the network traffic marker 420, to the session continuity impact metric. Thus, the entries 405 can be filtered by those that would permit a P-GW relocation given a session continuity impact metric.

The example methods described below can use any combination of components described above in FIGS. 1-4 or other components to perform the described operations. Thus, although specific components may be used below for illustrative purposes, the described methods are not limited to running on those components.

Figure 5:
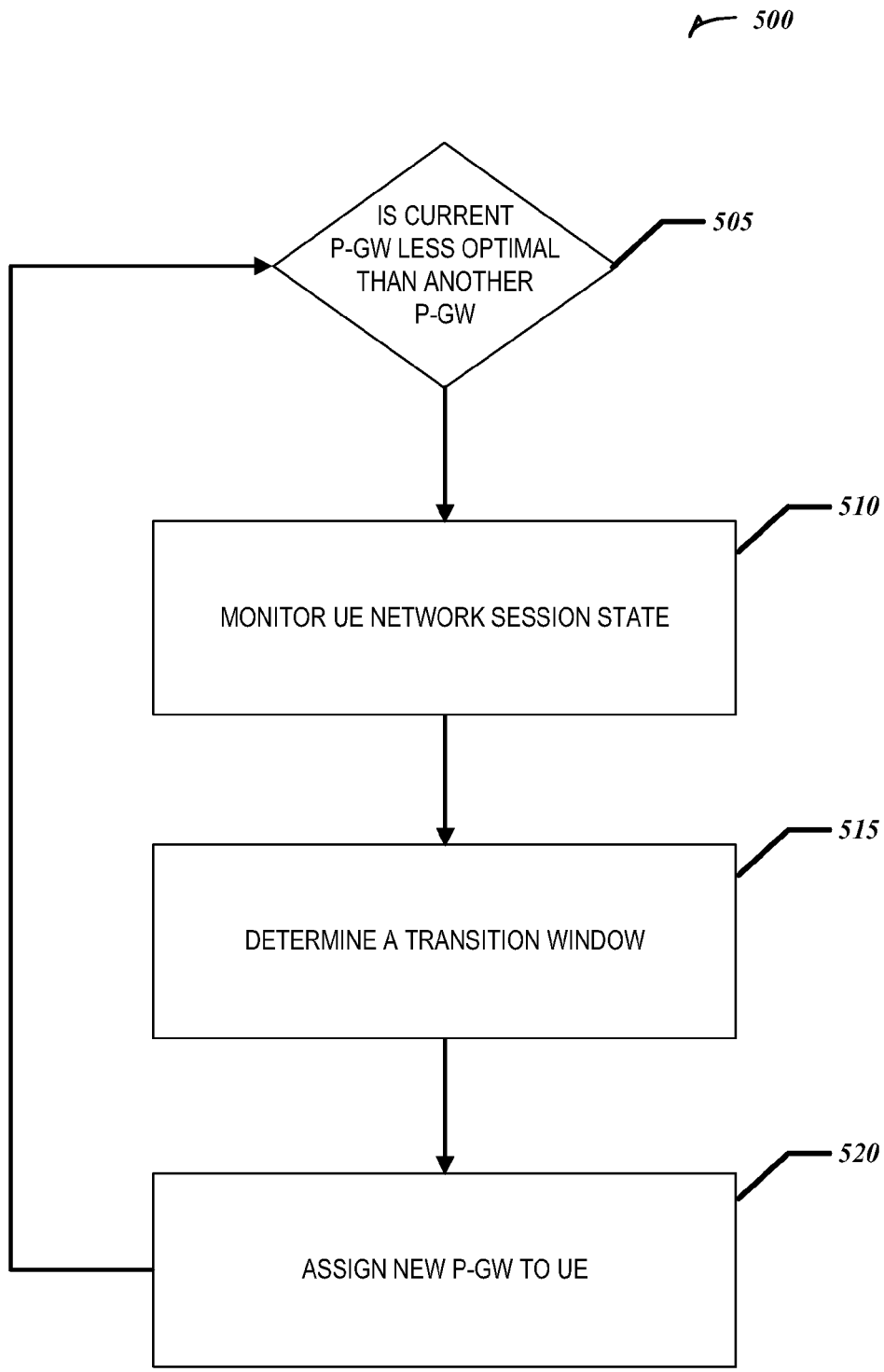
FIG. 5 illustrates a flowchart for an example method of intelligent P-GW relocation for SIPTO service continuity, according to one embodiment.

FIG. 5 illustrates a flowchart for an example method 500 of intelligent P-GW relocation for SIPTO service continuity, according to one embodiment.

At operation 505 a determination that a current P-GW 150 of the UE 120 is less optimal, in at least one performance metric, than the new P-GW can be made (e.g., by the UE application monitoring module 110). This determination can be made as described above with respect to FIGS. 1 and 2. In an example, operation 505 can occur before or after any of operations 510-520. That is, operation 505 is not dependent upon (e.g., is independent of) any other operation describe in FIG. 5.

At operation 510 the network session state for a UE 120 can be monitored (e.g., at UE application monitoring module 110). In an example, the network session state can include the session state of an application 315 running on the UE 120. In an example, monitoring the network session state for the UE can include inspecting the network traffic of the application using deep packet inspection. In an example, the monitoring can include identifying an application service provider 165 (e.g., a service vendor) for the application 315 and retrieve, from the application service provider 165, an impact of the session state of the application 315 for changing the PDN characteristic.

At operation 515 a transition window based on both the network session state and a session continuity impact metric can be determined. In an example, determining the transition window includes determining a time period in which changing the PDN characteristic would not affect network session continuity of the application 315 to a degree greater than the session continuity impact metric. In an example, changing the PDN characteristic can include changing an IP address for the UE 120. In an example, the session continuity impact metric is a degree of service interruption for the application 315 perceived by a user of the UE 120. In an example, the degree of service interruption is zero (e.g., the user perceives no interruption). In an example, when monitoring of operation 505 includes retrieving an impact of the session state from the application service provider 165, determining the time period can include identifying a beginning of the time period in response to matching the session continuity impact metric to the retrieved impact of the session state of the application.

At operation 520 a new P-GW can be associated to the UE 120 during the transition window. In an example, associating the new P-GW to the UE 120 can include changing the PDN characteristic of the UE 120. In an example, changing the PDN characteristic can affect network session continuity of the application.

Figure 6:
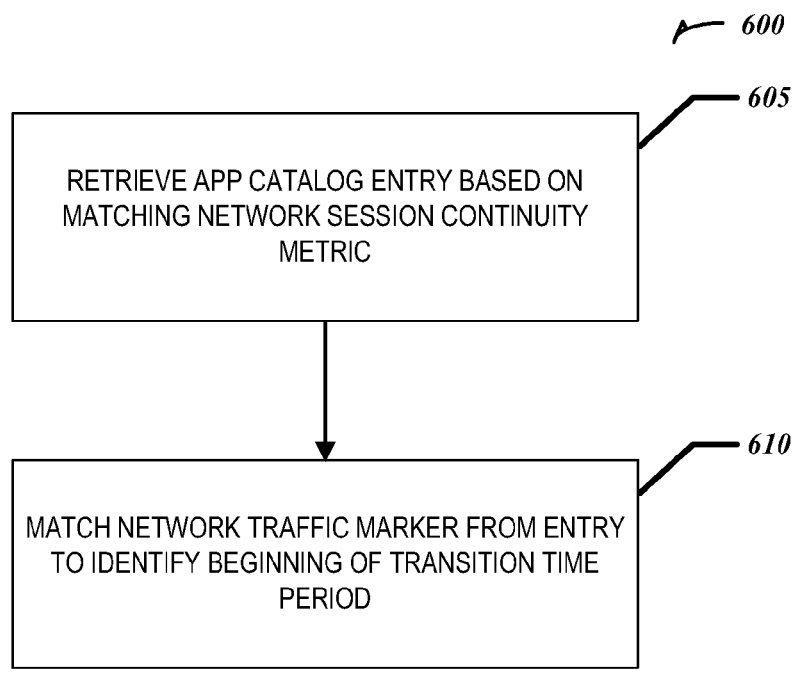
FIG. 6 illustrates a flowchart for an example method of determining a time period to meet an impact metric of network session continuity using an application catalog, according to one embodiment.

FIG. 6 illustrates a flowchart for an example method 600 of determining a time period to meet an impact metric of network session continuity using an application catalog (e.g., as described in operation 515 of FIG. 5), according to one embodiment. Method 600 can be performed with the application catalog 155 (e.g., as described above with respect to FIGS. 1 and 4) including entries 405, each entry 420 including a network traffic marker 420. The network traffic marker 420 can be observable (e.g., by the UE application monitoring module 110) via DPI, can correspond to a point in a network session for the application 315, and can include the impact on the network session for changing the PDN characteristic at the point in the network session for the application 315.

At operation 605 an entry corresponding to the application 315 can be retrieved (e.g., by the UE application monitoring module 110) based on matching the impact on the network session continuity, from the network traffic marker 420 of the entry (e.g., entry A 405A), to the session continuity impact metric.

At operation 610 the beginning of the time period can be identified based on matching the network traffic marker 420 to the session state of the application determined by DPI (e.g., by the UE application monitoring module 110).

Figure 7:
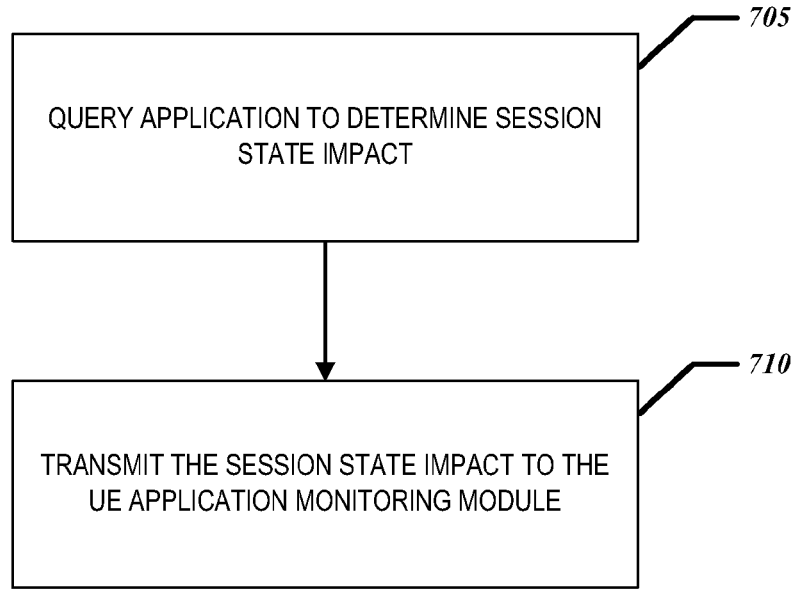
FIG. 7 illustrates a flowchart for an example method of determining a time period to meet an impact metric of network session continuity using information collected by the UE, according to one embodiment.

FIG. 7 illustrates a flowchart for an example method 700 of determining a time period to meet an impact metric of network session continuity using information collected by the UE 120, according to one embodiment. Method 700 can be performed when monitoring the network session state for the UE 120 (e.g., as described in operation 510 of FIG. 5) includes receiving the impact of the session state of the application 315 for changing the PDN characteristic from the UE 120. Further, when determining the time period (e.g., as described in operation 515 of FIG. 5) includes identifying the beginning of the time period in response to matching the session continuity impact metric to the received impact of the session state of the application 315. In an example, one or both of operations 705 and 710 can be performed on, or by, the UE 120 or components of the UE 120.

At operation 705 the application 315 can be queried (e.g., by the UE service module 320) to determine the impact of the session state of the application 315 (e.g., as described above with respect to FIGS. 1 and 3).

At operation 710 the impact of the session state of the application 315 (e.g., as determined at operation 705) can be transmitted to the core network 140 (e.g., to the UE application monitoring module 110). In an example, the impact of the session state of the application 315 can be transmitted in response to a request from the core network 140 (e.g., UE application monitoring module 110).

Figure 8:
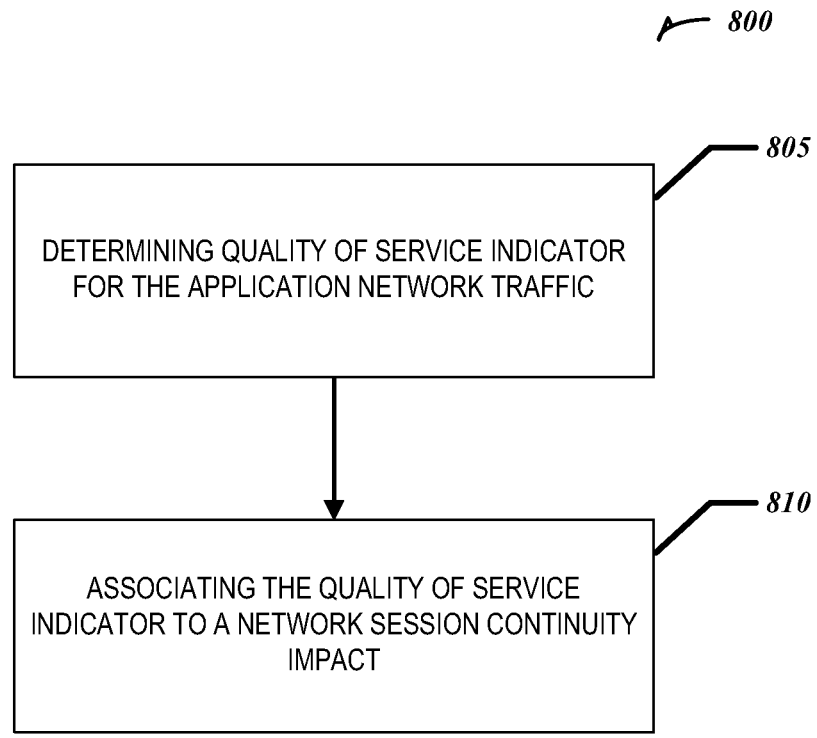
FIG. 8 illustrates a flowchart for an example method of monitoring UE network session state via network quality of service indicators.

FIG. 8 illustrates a flowchart for an example method 800 of monitoring UE network session state (as described in operation 510 of FIG. 5) via network QOS indicators.

At operation 805 the network QOS indicator of the application network traffic 125 can be determined (e.g., by the UE application monitoring module 110). In an example, the determination can be performed as described above with respect to FIG. 1.

At operation 810 the network QOS indicator (e.g., as determined at operation 805) can be associated to an impact on the network session for changing the PDN characteristic. In an example, the association can be performed as described above with respect to FIG. 1.

After the association of operation 810 is made, operation 510, specifically determining the time period, can be modified to include identifying the beginning of the time period in response to matching the session continuity impact metric to the impact of the session state of the application 315.

Figure 9:
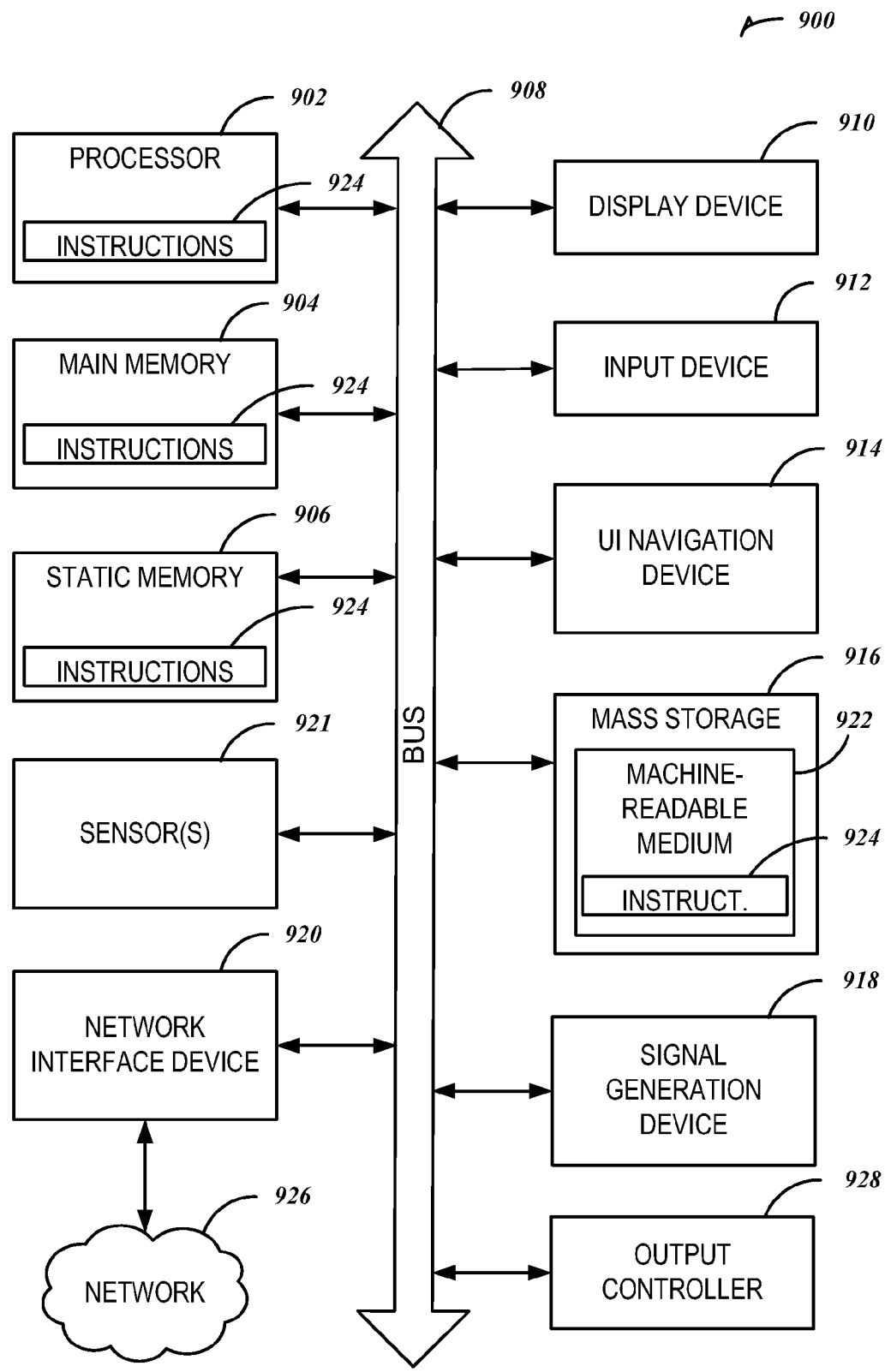
FIG. 9 illustrates a block diagram illustrating an example machine upon which one or more embodiments can be implemented.

FIG. 9 illustrates a block diagram of an example machine 900 upon which any one or more of the techniques (e.g., methodologies) discussed herein can perform. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 900 can include a hardware processor 902 (e.g., a central processing unit (CPU), a graphics processing unit (GPU), a hardware processor core, or any combination thereof), a main memory 904 and a static memory 906, some or all of which can communicate with each other via a bus 908. The machine 900 can further include a display unit 910, an alphanumeric input device 912 (e.g., a keyboard), and a user interface (UI) navigation device 911 (e.g., a mouse). In an example, the display unit 910, input device 917 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 can include a machine-readable medium 922 on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute machine readable media.

While the machine-readable medium 922 is illustrated as a single medium, the term "machine readable medium" can include a single medium or multiple media (e.g., a centralized or distributed database, and/or associated caches and servers) that configured to store the one or more instructions 924.

The term "machine-readable medium" can include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

ADDITIONAL NOTES & EXAMPLES

Example 1 includes subject matter (such as an apparatus, device, or system) comprising a user equipment (UE) application monitoring module, wherein the UE monitoring module is configured to monitor a network session state for a UE, and determine a transition window based on both the network session state and a session continuity impact metric. The subject matter of Example 1 can also comprise a routing module configured to associate a new packet data network gateway (P-GW) to the UE during the transition window in response to a determination that a current P-GW of the UE is less optimal, in at least one performance metric, than the new P-GW.

In Example 2, the subject matter of Example 1 can optionally include wherein the network session state includes the session state of an application running on the UE.

In Example 3, the subject matter of Example 2 can optionally include wherein to associate the new P-GW to the UE includes a change in a packet data network (PDN) characteristic of the UE, wherein changing the PDN characteristic affects network session continuity of the application, and wherein to determine the transition window based on both the network session state and the session continuity impact metric includes the UE application monitoring module configured to determine a time period in which a change to the PDN characteristic would not affect network session continuity of the application to a degree greater than the session continuity impact metric.

In Example 4, the subject matter of Example 3 can optionally include wherein the change in the PDN characteristic is an internet protocol (IP) address change for the UE.

In Example 5, the subject matter of one or any combination of Examples 3-4 can optionally include wherein the session continuity impact metric is a degree of service interruption for the application perceived by a user of the UE.

In Example 6, the subject matter of Example 5 can optionally include wherein the degree of service interruption is zero.

In Example 7, the subject matter of one or any combination of Examples 3-6 can optionally include wherein to monitor the network session state for the UE includes the UE application monitoring module configured to inspect the network traffic of the application using deep packet inspection.

In Example 8, the subject matter of Example 7 can optionally include an application catalog communicatively coupled to the UE application monitoring module and including an entry corresponding to the application, wherein the entry includes a network traffic marker observable via the deep packet inspection, corresponding to a point in a network session for the application, and including an impact on the network session for changing the PDN characteristic at the point in the network session for the application, wherein to determine the time period includes the UE application monitoring module configured to retrieve the entry based on a match of the impact on the network session continuity, from the network traffic marker of the entry, to the session continuity impact metric, and identify a beginning of the time period based on a match of the network traffic marker to the session state of the application determined by deep packet inspection.

In Example 9, the subject matter of one or any combination of Examples 3-8 can optionally include wherein the UE application monitoring module is configured to identify a service vendor for the application, wherein to monitor the network session state for the UE includes the UE application monitoring module configured to retrieve, from the service vendor, an impact of the session state of the application for changing the PDN characteristic, and wherein to determine the time period includes the UE application monitoring module configured to identify a beginning of the time period in response to matching the impact metric of the network session continuity to the retrieved impact of the session state of the application.

In Example 10, the subject matter of one or any combination of Examples 3-9 can optionally include wherein to monitor the network session state for the UE includes the UE application monitoring module configured to receive an impact of the session state of the application for changing the PDN characteristic from the UE, and wherein to determine the time includes the UE application monitoring module configured to identify a beginning of the time period in response to matching the session continuity impact metric to the received impact of the session state of the application.

In Example 11, the subject matter of Example 10 can optionally include a UE service module on the UE, wherein the UE service module is configured to query the application to determine the impact of the session state of the application, and transmit the impact of the session state of the application to the UE application monitoring module.

In Example 12, the subject matter of Example 11 can optionally include wherein the UE service module is configured to transmit the impact of the session state of the application to the UE application monitoring module in response to a request from the UE application monitoring module.

In Example 13, the subject matter of one or any combination of Examples 3-12 can optionally include wherein to monitor the network session state for the UE includes the UE application monitoring module configured to determine a network quality of service (QOS) indicator of the network traffic of the application and associate the network QOS indicator to an impact on the network session for changing the PDN characteristic, and wherein to determine the time period includes the UE application monitoring module configured to identify a beginning of the time period in response to matching the session continuity impact metric to the impact of the session state of the application.

In Example 14, the subject matter of one or any combination of Examples 1-13 can optionally include wherein the UE application monitoring module and the routing module are included in a mobility management entity (MME) of a 3GPP LTE Advanced network.

Example 15 can include, or can optionally be combined with the subject matter of one or any combination of Examples 1-14 to include, subject matter (such as a method, means for performing acts, or a machine-readable medium including instruction that, when performed by the machine cause the machine to perform acts) comprising monitoring, at a user equipment (UE) application monitoring module, a network session state for a UE, determining a transition window based on both the network session state and a session continuity impact metric, and associating a new packet data network gateway (P-GW) to the UE during the transition window in response to a determination that a current P-GW of the UE is less optimal, in at least one performance metric, than the new P-GW.

In Example 16, the subject matter of Example 15 can optionally include wherein the network session state includes the session state of an application running on the UE.

In Example 17, the subject matter of Example 16 can optionally include wherein associating the new P-GW to the UE includes changing a packet data network (PDN) characteristic of the UE, wherein changing the PDN characteristic affects network session continuity of the application, and wherein determining the transition window based on both the network session state and the session continuity includes determining a time period in which changing the PDN characteristic would not affect network session continuity of the application to a degree greater than the session continuity impact metric.

In Example 18, the subject matter of Example 17 can optionally include changing the PDN characteristic is changing an internet protocol (IP) address for the UE.

In Example 19, the subject matter of one or any combination of Examples 17-18 can optionally include wherein the session continuity impact metric is a degree of service interruption for the application perceived by a user of the UE.

In Example 20, the subject matter of Example 19 can optionally include wherein the degree of service interruption is zero.

In Example 21, the subject matter of one or any combination of Examples 17-20 can optionally include wherein monitoring the network session state for the UE includes inspecting the network traffic of the application using deep packet inspection.

In Example 22, the subject matter of Example 21 can optionally include wherein determining the time period includes retrieving an entry corresponding to the application from an application catalog based on matching an impact on the network session continuity, from a network traffic marker of the entry, to the session continuity impact metric, identifying a beginning of the time period based on matching the network traffic marker to the session state of the application determined by deep packet inspection and wherein the network traffic marker is observable via the deep packet inspection, corresponds to a point in a network session for the application, and includes the impact on the network session for changing the PDN characteristic at the point in the network session for the application.

In Example 23, the subject matter of one or any combination of Examples 15-27 can optionally include wherein monitoring the network session state for the UE includes identifying a service vendor for the application, retrieving, from the service vendor, an impact of the session state of the application for changing the PDN characteristic, and wherein determining the time period includes identifying a beginning of the time period in response to matching the session continuity impact metric to the retrieved impact of the session state of the application.

In Example 24, the subject matter of one or any combination of Examples 17-23 can optionally include wherein monitoring the network session state for the UE includes receiving an impact of the session state of the application for changing the PDN characteristic from the UE, and wherein determining the time period includes identifying a beginning of the time period in response to matching the session continuity impact metric to the received impact of the session state of the application.

In Example 25, the subject matter of Example 24 can optionally include querying, by a UE service module on the UE, the application to determine the impact of the session state of the application, and transmitting the impact of the session state of the application to the UE application monitoring module.

In Example 26, the subject matter of Example 25 can optionally include wherein transmitting the impact of the session state of the application to the UE application monitoring module is in response to a request from the UE application monitoring module.

In Example 27, the subject matter of one or any combination of Examples 17-26 can optionally include wherein monitoring the network session state for the UE includes determining a network quality of service (QOS) indicator of the network traffic of the application, associating the network QOS indicator to an impact on the network session for changing the PDN characteristic, and wherein determining the time period includes identifying a beginning of the time period in response to matching the session continuity impact metric to the impact of the session state of the application.

In Example 28, the subject matter of one or any combination of Examples 15-27 can optionally include wherein the UE application monitoring module is included in a mobility management entity (MME) of a network according to a 3GPP LTE-A family of standards.

Example 29 can include, or can optionally be combined with the subject matter of one or any combination of Examples 1-28 to include, subject matter (such as a method, means for performing acts, or a machine-readable medium including instruction that, when performed by the machine cause the machine to perform acts) comprising monitoring, mobility management entity (MME) according to a 3GPP LTE-A family of standards, a network session state of an application running on user equipment (UE), determining a transition window based on both the network session state and a session continuity impact metric including determining a time period in which changing an internet protocol (IP) address of the UE would not affect network session continuity of the application to a degree greater than the session continuity impact metric, and associating a new packet data network gateway (P-GW) to the UE during the transition window in response to a determination that a current P-GW of the UE is less optimal, in at least one performance metric, than the new P-GW of the UE, and wherein associating the new P-GW to the UE includes changing the IP address of the UE.

In Example 30 the subject matter of Example 29 can optionally include wherein monitoring the network session state of the application includes determining a session state of the application associated with an impact on the network session for changing the IP address via one or more of using deep packet inspection of the application's network traffic, receiving application information from the UE, retrieving application information from a service provider of the application, and determining a network quality of service (QOS) indicator of the application's network traffic, and wherein determining the time period includes identifying a beginning of the time period in response to matching the session continuity impact metric to the impact of the session state of the application.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A network infrastructure component comprising:
   an application catalog including an entry corresponding to an application running on user equipment (UE), the entry including:
      a network traffic marker observable via deep packet inspection, corresponding to a point in a network session for the application, the marker including an impact on the network session for changing a packet data network (PDN) characteristic of the UE at the point in the network session for the application;
   a UE application monitoring module configured to:
      monitor a network session state for the UE by inspecting network traffic of the application using deep packet inspection, the network session state being a monitorable state of the network session of the UE and includes a session state of the application;
      retrieve the entry based on a match of the impact on the network session continuity, from the network traffic marker of the entry, to a session continuity impact metric, the session continuity impact metric being a degree of service interruption perceived by a user of the UE;
      identify a beginning of a time period based on a match of the network traffic marker to the session state of the application determined by the deep packet inspection; and
      determine a transition window based on the beginning of the time period, the transition window being the time period in which changing the PDN characteristic will not disrupt the network session state by a degree greater than the session continuity impact metric; and
   a routing module configured to associate a new packet data network gateway (P-GW) to the UE during the transition window in response to a determination that a current P-GW of the UE is less optimal, in at least one performance metric, than the new P-GW, wherein to associate the new P-GW to the UE includes a change in the PDN characteristic of the UE.

2. The network infrastructure component of claim 1, wherein the UE application monitoring module is configured to determine a second transition window based on both the network session state and the session continuity impact metric, the second transition window being a second time period in which changing the PDN characteristic will not disrupt the network session state by a greater degree than the session continuity impact metric.

3. The network infrastructure component of claim 1, wherein the change in the PDN characteristic is an internet protocol (IP) address change for the UE.

4. The network infrastructure component of claim 1, wherein the degree of service interruption is zero.

5. The network infrastructure component of claim 2, wherein the UE application monitoring module is configured to identify a service vendor for the application;
   wherein to monitor the network session state for the UE includes the UE application monitoring module configured to retrieve, from the service vendor, the impact of the network session; and
   wherein to determine the second time period includes the UE application monitoring module configured to identify a beginning of the second time period in response to matching the session continuity impact metric to the retrieved impact of the network session.

6. The network infrastructure component of claim 2, wherein to monitor the network session state for the UE includes the UE application monitoring module configured to receive the impact of the network session from the UE; and
   wherein to determine the second time period includes the UE application monitoring module configured to identify a beginning of the second time period in response to matching the session continuity impact metric to the received impact of the network session.

7. The network infrastructure component of claim 6, further comprising a UE service module on the UE, wherein the UE service module is configured to:
   query the application to determine the impact of the network session; and
   transmit the impact of the network session to the UE application monitoring module.

8. The network infrastructure component of claim 7, wherein the UE service module is configured to transmit the impact of the network session to the UE application monitoring module in response to a request from the UE application monitoring module.

9. The network infrastructure component of claim 2, wherein to monitor the network session state for the UE includes the UE application monitoring module configured to determine a network quality of service (QOS) indicator of the network traffic of the application and associate the network QOS indicator to the impact of the network; and
   wherein to determine the second time period includes the UE application monitoring module configured to identify a beginning of the second time period in response to matching the session continuity impact metric to the impact of the network session.

10. The network infrastructure component of claim 1, wherein the network infrastructure component is a 3GPP LTE-A mobility management entity (MME).

11. A method performed by a network infrastructure component for packet data network (PDN) gateway (P-GW) relocation, the method comprising:
    monitoring, at a user equipment (UE) application monitoring module, a network session for a UE using deep packet inspection, the network session including a session state of the application;
    retrieving an entry, corresponding to an application running on the UE, from an application catalog based on matching an impact on the network session continuity, from a network traffic marker of the entry, to a session continuity impact metric, the session continuity impact metric being a degree of service interruption perceived by a user of the UE, the network traffic marker being observable via the deep packet inspection, the entry including an impact on the network session for changing a packet data network (PDN) characteristic of the network session for the application;
    identifying a beginning of a time period based on matching the network traffic marker to the network session state of the application determined by the deep packet inspection;
    determining a transition window based on the beginning of the time period, the transition window being the time period in which changing the PDN characteristic will not disrupt the network session by a degree greater than the session continuity impact metric; and
    associating a new packet data network gateway (P-GW) to the UE during the transition window in response to a determination that a current P-GW of the UE is less optimal, in at least one performance metric, than the new P-GW.

12. The method of claim 11, further comprising:
    determining, by the UE application monitoring module, a second transition window based on both the network session and the session continuity impact metric, the second transition window being a second time period in which changing the PDN characteristic will not disrupt the network session by a greater degree than the session continuity impact metric.

13. The method of claim 11, wherein changing the PDN characteristic is changing an internet protocol (IP) address for the UE.

14. The method of claim 11, wherein the degree of service interruption is zero.

15. The method of claim 12, wherein monitoring the network session state for the UE includes:
    identifying a service vendor for the application;
    retrieving, from the service vendor, the impact on the network session; and
    wherein determining the second time period includes identifying a beginning of the second time period in response to matching the session continuity impact metric to the retrieved impact on the network session.

16. The method of claim 12, wherein monitoring the network session state for the UE includes receiving the impact of the network session from the UE; and
    wherein determining the second time period includes identifying a beginning of the second time period in response to matching the session continuity impact metric to the received impact of the network session.

17. The method of claim 16, further comprising:
    querying, by a UE service module on the UE, the application to determine the impact on the network session; and
    transmitting the impact on the network session of the application to the UE application monitoring module.

18. The method of claim 17, wherein transmitting the impact on the network session of the application to the UE application monitoring module is in response to a request from the UE application monitoring module.

19. The method of claim 12, wherein monitoring the network session state for the UE includes:
    determining a network quality of service (QOS) indicator of the network traffic of the application;
    associating the network QOS indicator to the impact on the network session; and
    wherein determining the second time period includes identifying a beginning of the second time period in response to matching the session continuity impact metric to the impact on the network session.

20. The method of claim 11, wherein the UE application monitoring module is included in a 3GPP LTE-A mobility management entity (MME).

21. A non-transitory machine readable medium including instructions, which when executed by the machine, cause the machine to perform operations comprising:
monitoring, using a 3GPP LTE-A mobility management entity (MME), a network session of an application running on user equipment (UE) using deep packet inspection;
retrieving an entry, corresponding to an application running on the UE, from an application catalog based on matching an impact on the network session continuity, from a network traffic marker of the entry, to a session continuity impact metric, the session continuity impact metric being a degree of service interruption perceived by a user of the UE, the network traffic marker being observable via the deep packet inspection, the entry including an impact on the network session for changing a packet data network (PDN) characteristic of the network session for the application;
identifying a beginning of a time period based on matching the network traffic marker to the network session state of the application determined by the deep packet inspection;
determining a transition window based on the beginning of the time period, the transition window being the time period in which changing the PDN characteristic will not disrupt the network session by a degree greater than the session continuity impact metric; and
associating a new packet data network gateway (P-GW) to the UE during the transition window in response to a determination that a current P-GW of the UE is less optimal, in at least one performance metric, than the new P-GW of the UE, and wherein associating the new P-GW to the UE includes changing an internet protocol (IP) address of the UE.

22. The machine readable medium of claim 21, wherein monitoring the network session of the application includes determining the impact on the network session for changing the IP address via one or more of:
receiving application information from the UE;
retrieving application information from a service provider of the application; and
determining a network quality of service (QOS) indicator of the application's network traffic; and
comprising determining a second time period by identifying a beginning of the second time period in response to matching the session continuity impact metric to the impact on the network session.

* * * * *